United States Patent
Österlund et al.

(10) Patent No.: US 11,675,893 B2
(45) Date of Patent: Jun. 13, 2023

(54) VERIFICATION APPLICATION, METHOD, ELECTRONIC DEVICE AND COMPUTER PROGRAM

(71) Applicant: PRECISE BIOMETRICS AB, Lund (SE)

(72) Inventors: Petter Österlund, Karlstad (SE); Henrik Hjalmarsson, Skoghall (SE)

(73) Assignee: PRECISE BIOMETRICS AB, Lund (SE)

( * ) Notice: Subject to any disclaimer, the term of this patent is extended or adjusted under 35 U.S.C. 154(b) by 27 days.

(21) Appl. No.: 16/373,131

(22) Filed: Apr. 2, 2019

(65) Prior Publication Data
US 2019/0228146 A1   Jul. 25, 2019

Related U.S. Application Data

(63) Continuation of application No. 14/322,082, filed on Jul. 2, 2014, now abandoned.

(30) Foreign Application Priority Data

Jul. 2, 2013 (SE) .................................. 1350821-3

(51) Int. Cl.
*H04L 29/00* (2006.01)
*G06F 21/45* (2013.01)
(Continued)

(52) U.S. Cl.
CPC .............. *G06F 21/45* (2013.01); *G06F 21/32* (2013.01); *G06F 21/33* (2013.01); *G06F 21/41* (2013.01)

(58) Field of Classification Search
CPC ........... G06F 21/45; G06F 21/32; G06F 21/33
(Continued)

(56) References Cited

U.S. PATENT DOCUMENTS 5,848,231 A   12/1998   Teitelbaum et al.
6,377,691 B1   4/2002   Swift et al.
(Continued)

FOREIGN PATENT DOCUMENTS

WO        9852115         11/1998
WO    WO-0054126 A1 *  9/2000   ......... H04L 63/0853
(Continued)

OTHER PUBLICATIONS

Java Authentication and Authorization Service (JAAS) Reference Guide for the Java SE Development Kit 6, 2011, Internet Publication at web site address: http://docs.oracle.com/javase/6/docs/technotes/guides/security/jaas/JAASRefGuide.html.
(Continued)

*Primary Examiner* — Jeffrey C Pwu
*Assistant Examiner* — Michael D Anderson
(74) *Attorney, Agent, or Firm* — Capitol City TechLaw (57) ABSTRACT

There is a verification application arranged to interact with other applications on an electronic device, the electronic device having a processor, a memory and an operating system controlling operation of the verification application and the other applications on the processor using arbitrary memory locations, where the other applications are enabled to call the verification application to securely determine authenticity of a user of the electronic device. The verification application is arranged to receive verification data for secure determination of authenticity of the user; and provide, upon a call from any of the other applications and a match between the verification data and a verification reference, a trust token to the calling application. A method, electronic device and computer program are also disclosed.

15 Claims, 7 Drawing Sheets

(51) Int. Cl.
*G06F 21/32* (2013.01)
*G06F 21/33* (2013.01)
*G06F 21/41* (2013.01)

(58) Field of Classification Search
USPC .......................................................... 726/19
See application file for complete search history.

(56) References Cited

U.S. PATENT DOCUMENTS

| | | | | |
|---|---|---|---|---|
| 7,627,894 | B2* | 12/2009 | Kiss | H04L 63/10 |
| | | | | 726/27 |
| 7,627,895 | B2* | 12/2009 | Gifford | G06F 21/32 |
| | | | | 235/380 |
| 7,715,593 | B1* | 5/2010 | Adams | G06Q 20/341 |
| | | | | 382/115 |
| 8,135,134 | B2* | 3/2012 | Orsini | H04L 9/083 |
| | | | | 380/278 |
| 9,922,210 | B2* | 3/2018 | Oberg | H04W 12/35 |
| 2008/0065892 | A1* | 3/2008 | Bailey | H04L 63/0492 |
| | | | | 713/171 |
| 2011/0179477 | A1 | 7/2011 | Starnes et al. | |
| 2012/0019361 | A1 | 1/2012 | Ben Ayed | |

FOREIGN PATENT DOCUMENTS

| | | |
|---|---|---|
| WO | 0111450 A1 | 2/2001 |
| WO | 0122651 A2 | 3/2001 |
| WO | 0137067 A1 | 5/2001 |
| WO | 2008024454 A1 | 2/2008 |

OTHER PUBLICATIONS

Java Authentication and Authorization Service (JAAS) LoginModule Developer's Guide, 2011, Internet Publication at web site address: http//docs.oracle.com/javase/6/docs/technotes/guides/security/jaas/JAASLMDevGuide.html.

Paul Madsen, "Enabling SSO for native applications", RSA Conference 2013, Feb. 24, 2013, pp. 1-21, published on the internet at: https://www.rsaconference.com/writable/presentations/file_upload/iam-f42b.pdf.

* cited by examiner

VERIFICATION APPLICATION, METHOD, ELECTRONIC DEVICE AND COMPUTER PROGRAM

This application is a continuation application of U.S. patent application Ser. No. 14/322,082, which was filed Jul. 2, 2014, the entire content of which is incorporated herein by reference.

This application claims priority under 35 USC § 119 to Swedish Patent Application No. 1350821-3, which was filed on Jul. 2, 2013, the entire content of which is incorporated herein by reference.

TECHNICAL FIELD

The present invention generally relates to a verification application arranged to interact with other applications on an electronic device, such an electronic device, a method and a computer program.

BACKGROUND

Electronic devices with processing power, where applications can be downloaded and used provide great versatility of the device to its user. Some of the applications do need or would need some way to authenticate the user, e.g. to secure integrity or other values. Some applications have such arrangements. However, a user having a multitude of applications downloaded into its electronic device may then face a corresponding multitude of security solutions and all their different ways of interacting with the user.

An operating system of the electronic device may provide some solutions for aggregate security.

However, it has shown that design of security solutions integrated in the operating system which supports the evolving market of applications is a task that seldom keeps the pace with the development of applications.

Other approaches have been suggested. WO 01/37067 A1 discloses an approach for secure linkage between program modules so they can authenticate each other and provide security for digital content accessed by one or more of the modules. By storing at least one address of at least one function of a first program module in a file, calling the second program module by the first program module and passing the file to the second program module, verifying integrity by the second program module of the first program module, and calling by the second program module a selected function of the first program module using an address obtained from the file when integrity of the first program module is verified, a secure linkage between the first and second program modules can be provided. The approach relies on a call back address within the program module to be authenticated. This approach may however not be versatile enough for the evolving environment indicated above since it relies on a particular addressing of memory.

It is therefore a desire to provide an improved security solution for an application environment.

SUMMARY

An object of the invention is to at least alleviate the above stated problem. The present invention is based on the understanding that an application working on peer level with other applications is suitable for keeping pace with the application evolution. The inventors have realised that provision of an application for security solutions interacting with other applications on a peer level is capable of alleviating the above stated problem.

According to a first aspect, there is provided a verification application arranged to interact with other applications on an electronic device, the electronic device having a processor, a memory and an operating system controlling operation of the verification application and the other applications on the processor using arbitrary memory locations, where the other applications are enabled to call the verification application to securely determine authenticity of a user of the electronic device. The verification application is arranged to receive verification data for secure determination of authenticity of the user; and provide, upon a call from any of the other applications and a match between the verification data and a verification reference, a trust token to the calling application.

The verification application may be arranged to be paired with at least one of the other applications by mutually exchanging at least one of application signature, cryptographic key or keys, password, and a shared secret. The provision of the trust token may only be provided when the verification application and the one of the other applications providing a call to the verification application are properly paired.

The trust token may comprise information generated by a cryptographic mechanism of the verification application.

The trust token may comprise any of a cryptographic key, a shared secret, an identity or data associated with a user, and a security credential, stored by the verification application.

Parameters for generation of the trust token may, upon installation of the verification application on the electronic device, be set and the verification reference may be enrolled.

The call from the one of the other applications may include an indicator on a degree of required certainty in the match wherein the match between the verification data and the verification reference may be considered present if an estimated false acceptance rate by a matching mechanism of the verification application is less than the degree of required certainty in the match. The trust token may include or be accompanied by an authenticity indicator, wherein the authenticity indicator may be based on the estimated false acceptance rate by the matching mechanism.

The verification application may further be arranged to provide an indicator on broken or no trust if a degree of required certainty in the authentication for the match between the received verification data and the verification reference is reset to a lower certainty level than before the reset, the calling application is not properly paired with the verification application, or a combination thereof.

To receive verification data may comprise to receive a biometric sample, the verification reference may be a biometric reference and the match between the verification data and the verification reference may be performed by a biometric matching mechanism of the verification application, wherein the biometric matching mechanism may be arranged to match the biometric sample to the biometric reference.

According to a second aspect, there is provided a method of a verification application arranged to interact with other applications on an electronic device, the electronic device having a processor, a memory and an operating system controlling operation of the verification application and the other applications on the processor using arbitrary memory locations. The method comprises receiving a call to the verification application from one of the other applications to securely determine authenticity of a user of the electronic device, receiving a verification data, authenticating the verification data by matching to a verification reference stored by the verification application, and providing, upon a match between the verification data and the verification reference, a trust token to the calling application.

The method may comprise pairing the verification application with at least one of the other applications by mutually exchanging at least one of application signature, cryptographic key, and a password. The providing of the trust token may only be performed when the verification application and the one of the other applications providing a call to the verification application are properly paired.

The providing of the trust token may comprise generating information by a cryptographic mechanism of the verification application.

The providing of the trust token may comprise any of a cryptographic key, a shared secret, an identity or data associated with a user, and a security credential stored by the verification application.

The method may comprise providing an indicator on broken or no trust if the degree of required certainty in the authentication for the match between the received verification data and the verification reference is reset to a lower certainty level, the calling application is not properly paired with the verification application, or a combination thereof.

The method may comprise, upon installation of the verification application on the electronic device, setting parameters for generation of the trust token, and enrolling the verification reference.

The call from the one of the other applications may include an indicator on a degree of required certainty in the matching wherein the match between the verification data and the verification reference may be considered present if an estimated false acceptance rate by the matching is less than the degree of required certainty. The trust token may include or be accompanied by an authenticity indicator, wherein the authenticity indicator may be based on the estimated false acceptance rate by the matching.

The receiving of verification data may comprise receiving a biometric sample, the verification reference may be a biometric reference and the matching between the verification data and the verification reference may be performed by biometric matching of the biometric sample to the biometric reference.

According to third aspect, there is provided a computer program comprising computer executable instructions which when executed by a processor of an electronic device having the processor, a memory and an operating system controlling operation of applications on the processor using arbitrary memory locations, wherein the computer executable instruction causes the processor to perform the method of the second aspect.

According to a fourth aspect, there is provided an electronic device having a processor, a memory and an operating system, comprising a verification application according to the first aspect, at least one other application enabled to call the verification application to securely determine authenticity of a user of the electronic device, and a verification data input arranged to provide verification data to the verification application, wherein the operating system is arranged to control operation of the verification application and the other applications on the processor using arbitrary memory locations.

The verification data input may comprise a biometric reader arranged to provide biometric samples as verification data, and the verification application is according to corresponding ones of the first aspect.

Other objectives, features and advantages of the present invention will appear from the following detailed disclosure, from the attached dependent claims as well as from the drawings. Generally, all terms used in the claims are to be interpreted according to their ordinary meaning in the technical field, unless explicitly defined otherwise herein. All references to "a/an/the [element, device, component, means, step, etc.]" are to be interpreted openly as referring to at least one instance of said element, device, component, means, step, etc., unless explicitly stated otherwise. The steps of any method disclosed herein do not have to be performed in the exact order disclosed, unless explicitly stated.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings.

FIG. 1 schematically illustrates an electronic device according to an embodiment.

FIG. 2 is a signal scheme illustrating functions according to embodiments.

DETAILED DESCRIPTION

FIG. 1 schematically illustrates an electronic device 100 according to an embodiment. The electronic device comprises a verification data input 102, which for example can be a biometric reader, an input for authentication code or password, and/or a smart card reader. The electronic device 100 also comprises a processor 104 and a memory 106. The processor 104 is arranged to run an operating system 108 which in turn is a collection of software that manages computer hardware resources and provides common services for computer programs. Among the computer programs, there is a verification application 110 and one or more other applications 112. In this context, applications are computer software implemented mechanisms that causes an electronic device with a processor to perform useful tasks beyond the running of the electronic device or processor itself, i.e. perform tasks that directly benefit a user. The verification application 110 pairs with one or more of the other applications 112 to establish a trust between the verification application 110 and the respective other application 112. An application 112 can then call the verification application 110 to check if a correct user is authenticated, and if authentication is in place and trust is established, the calling application 112 will get a trust token in return wherein the calling application can continue its task with a certain confidence that the correct user is the one handling the electronic device 100. The verification application 110 in turn is arranged to authenticate the user. This is performed for example by requiring an authentication code, password, biometric sample and/or hardware token to be presented by the user through the verification data input 102. The verification application 110 checks the authenticity of the user by matching the input data at verification data input 102 with a stored data set, e.g. matching a biometric sample with a stored biometric template, checking data from a hardware token that has been digested according to a cryptographic algorithm and/or comparing an input password with a stored password or a time-synchronised one-time password. The verification application 110 can be treated by the operating system 108 as any application, i.e. the verification application can be used in arbitrary memory locations and does not have to be handled in certain secure memory areas. The electronic device 100 can for example be a computer or a communication apparatus, or any combination thereof such as cell phone, Smartphone, tablet computer, laptop, etc. normally are. The electronic device 100 can of course also be a computer and/or communication apparatus which is a part of a machine, such as a tool or workshop machine, vehicle, vending or entertainment machine, monitoring or measuring instrument, etc. The electronic device 100 can of course also be any of the above given examples together with suitable accessories, such as accessories for the verification data input 102, possibly with some functional parts of the processor 104, which may be distributed between entities.

FIG. 2 is a signal scheme illustrating functions according to embodiments. A time axis is thought to go downwards in the figure. Signalling is demonstrated between the two entities verification application and other application, and also data input from a user to the verification application.

The upper part of the signalling scheme illustrates enrolment of a verification reference from the user and pairing of the verification application and the other application. The enrolment of the verification reference comprises the user presenting the verification data that later on is intended for authentication. As discussed above, this can be an authentication code, password, biometric sample and/or hardware token that is/are presented by the user through the verification data input. The enrolment can also comprise synchronising the verification application for time-synchronised one-time passwords, exchange of shared secrets or keys, or the like. The pairing of the verification application and the other application can comprise mutually exchanging at least one of an application signature, a cryptographic key or keys, a password, and a shared secret. The complexity of the pairing can depend on the security level demanded by the other application. An application including financial transactions can for example demand higher security level than an application only providing amusement activities for the user (but still demanding authentication of the user, e.g. for properly recording high scores). The pairing can for example include mutually checking certificates of the pairing applications, and/or receiving authentication of the pairing applications by a user or administrator, i.e. the applications are "told" to trust each other. Here, and administrator can for example be a vendor, operator or authority helping the user to install the applications in a secure and trusted way. When the check of the certificates and/or the authentication of the applications are successful, the applications are considered properly paired.

The lower part of the signalling scheme illustrates operation of the electronic apparatus where the user provides verification data to the verification application through the verification data input, as discussed above, for example when starting handling the electronic device. The verification application authenticates the user, and in this example it is assumed that authentication is correct. The user uses the other application, and the other application may at some point want to check the authenticity of the user, e.g. for making some transaction. The other application then calls the verification application, which knows that the authenticity of the user is correct. The verification application then sends a trust token to the other application, which checks the trust token and thereby get the affirmation that the correct user is handling the electronic device, or at least by a certain demanded security level. The other application can then proceed with the task that required the check. An advantage is that the user only needs to interact with one application for authentication, which enhances both usability and confidence from a security perspective for the user. Another advantage is that authentication functionality and user interface issues therefor do not have to be implemented in all applications.

Figure 3:
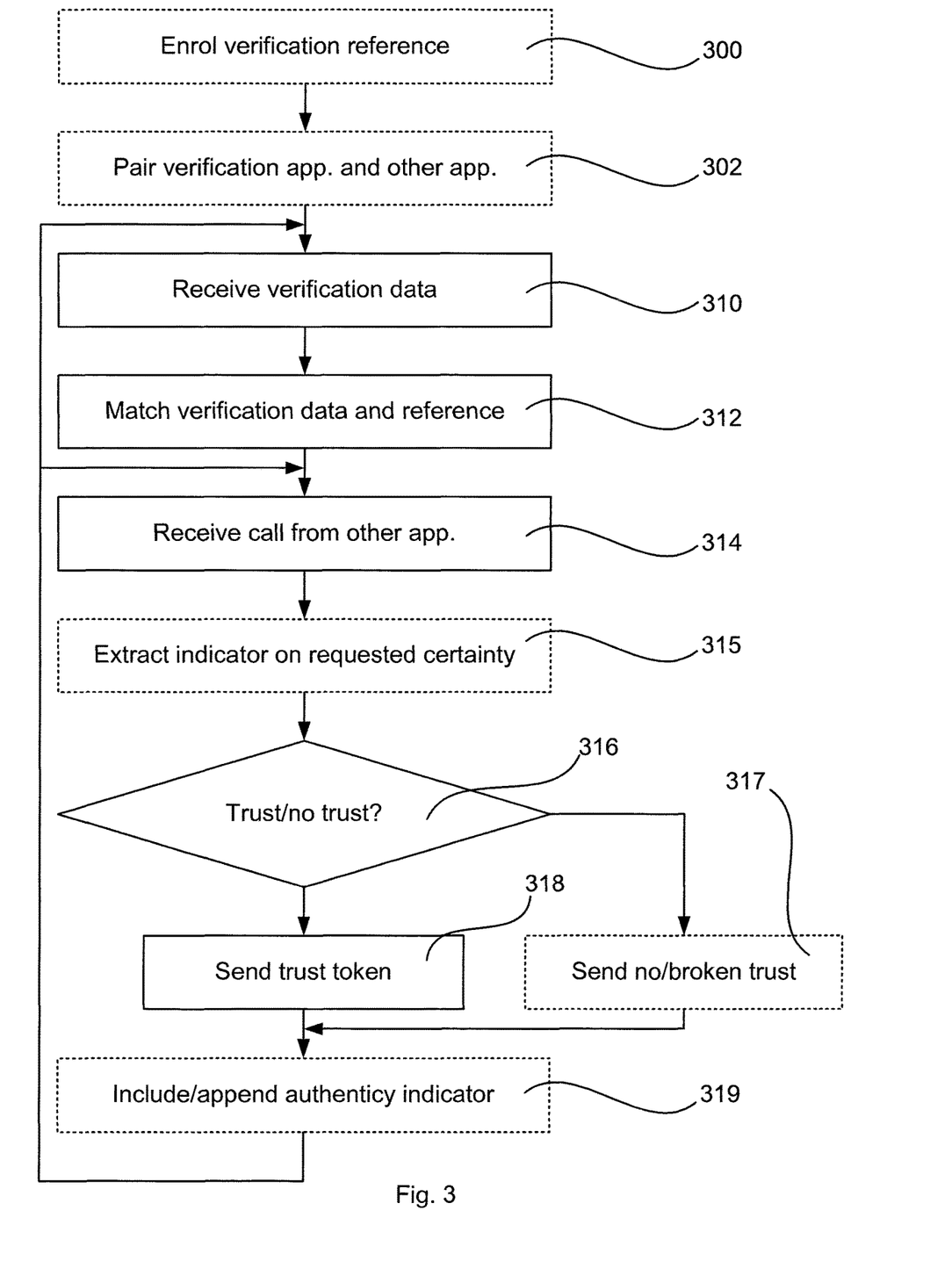
FIG. 3 is a flow chart illustrating methods according to embodiments.

FIG. 3 is a flow chart illustrating methods according to embodiments. As discussed above, verification data is received 310 by a verification application from a user. The verification data is matched 312 towards respective verification reference upon mismatch, the action can be to ignore the input, to request a new try, and/or to raise the security level, depending on authentication strategy, as is customary in the field. Upon a call from another application, the call is received 314, and it is determined 316 whether there is a trust or not based on the match and established pairing between the calling application and the verification application. If trust is determined, a trust token is sent 318 to the calling application. If there are any issues with the trust, a message about that can be sent 317 to the calling application. For example, if there is no appropriate pairing between the verification application and the calling application, the message can indicate no trust, or if proper pairing is made but the matching of the verification data failed or showed too low certainty, the message can indicate a broken trust. The message on trust/broken trust/no trust can be included or appended 319 with an authenticity indicator which can be an indicator on confidence level on authenticity. The process can then return to wait for another call from the calling application or from another application.

Upon initiation of the verification application, a verification reference is enrolled 300, as discussed above. Upon initiation of the verification application or when adding a new application to be able to call the verification application, the verification application is paired 302 with the other application, i.e. applications which are to call the verification application. This is performed as discussed above.

A calling application can include an indicator on requested certainty that the correct user is handling the apparatus. The indicator is then extracted 315 and the value thereof is used when determining 316 the trust. The verification application can save the extracted indicator to monitor if the requested level suddenly is changed, e.g. significantly lowered, which can be a sign on broken trust and be counted on in the determination 316 of the trust. The certainty is preferably estimated and the estimate can be based on for example how well a biometric sample matches a template, and also the quality of the template and/or complexity of the matching, but can also be based on aggregated verifications, e.g. a biometric match added up with a time-synchronised one-time password or a conventional password, or any other combination of two or more verifications as discussed above. The estimated certainty can be expressed as a false acceptance rate, FAR, i.e. the probability rate that an impostor manages to be accepted which can be expressed for example as a one on a million ($1/1000000$), which means that the impostor may be accepted one time of a million independent tries. The function for the aggregate estimate can be selected in different ways, e.g. by considering each partial verification as independent on each other and simply multiplying the respective estimates or calculations of rates of each partial verification, e.g. $1/1000$ multiplied by $1/10000$ becomes $1/10000000$, or using more complex aggregation algorithms.

Figure 4:
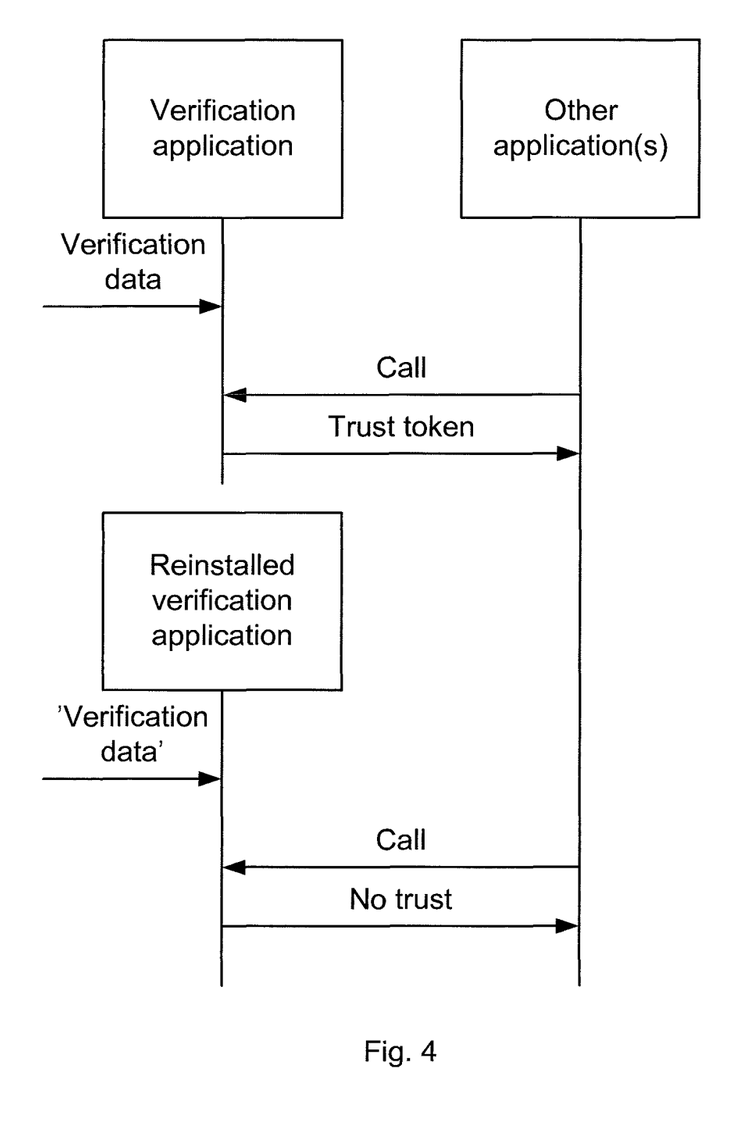
FIG. 4 is a signal scheme illustrating functions according to embodiments, in particular when a verification application is reinstalled without pairing.

FIG. 4 is a signal scheme illustrating functions according to embodiments, in particular when a verification application is reinstalled without pairing. The mechanism needs to be safe from backdoors in view of security. Thus, if an unauthorised user tries to tamper the device by uninstalling the verification application and re-install a verification application to be able to access some of the applications, e.g. by enrolling a new verification reference, the verification application will not be able to provide a proper trust to the calling application. The calling application is paired with the initially installed verification application and will not accept a trust token from the new verification application, i.e. any trust token from the new verification application will be interpreted as no trust.

Figure 5:
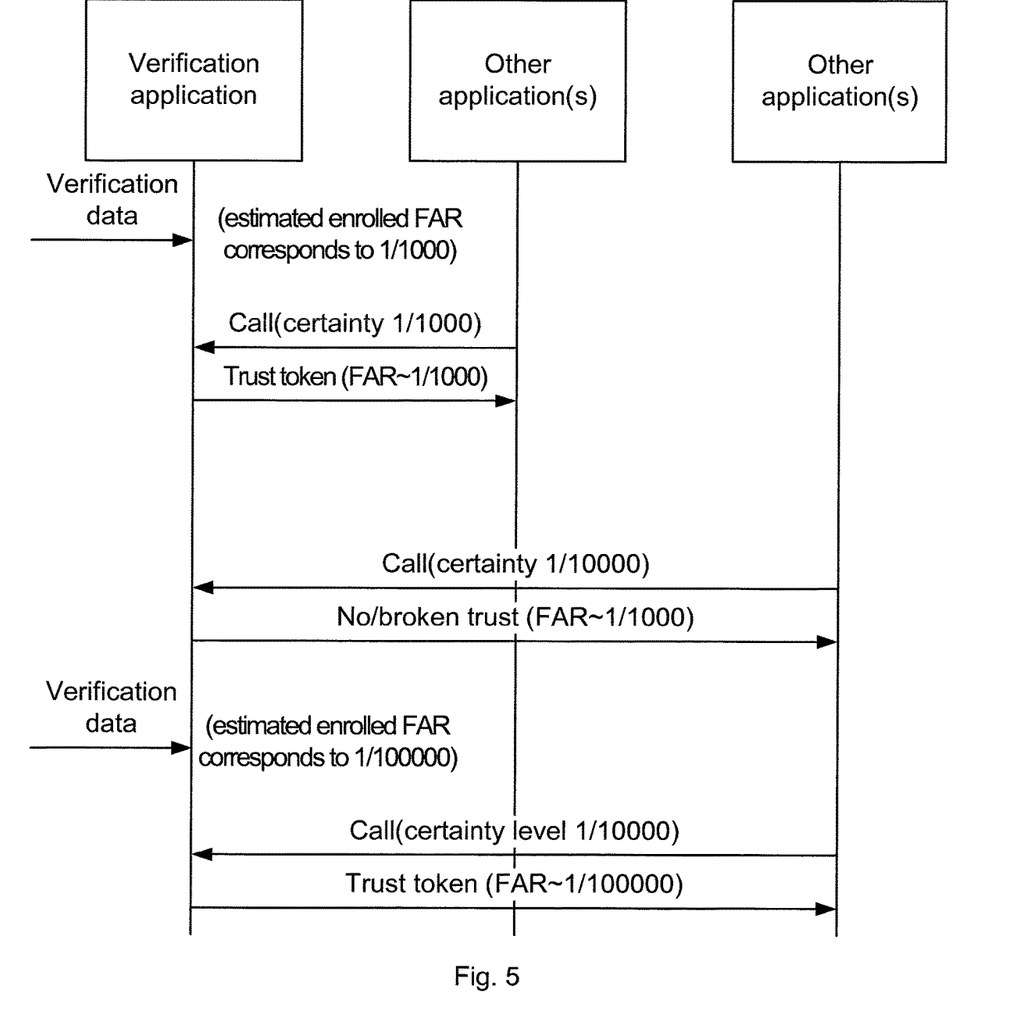
FIG. 5 is a signal scheme illustrating functions according to embodiments, in particular when a verification application serves multiple other applications with different certainty demands.

FIG. 5 is a signal scheme illustrating functions according to embodiments, in particular when a verification application serves multiple other applications with different certainty demands. In this figure, it is assumed that the applications and the verification application are properly paired. The verification application receives verification data from a user. The verification data is matched towards verification reference, and the false acceptance rate, FAR, is estimated to $1/1000$, i.e. the probability that an unauthorised user managed to get accepted by the matcher is $1/1000$. See also the discussion on estimation of FAR and aggregated FAR above.

A first application calls the verification application and the call includes an indicator on required level of certainty of $1/1000$. Since that level is estimated to be fulfilled, a trust token is sent from the verification application to the first application. The trust token can also include the estimated FAR value. The estimated FAR value can express the estimated FAR directly as for example $1/1000$, or the different levels can be encoded according to a FAR level scheme with two or more levels. Preferably, the levels are three or more. The FAR levels can be communicated as in the discussion on certainty levels below. Paired applications can for example (e.g. inherently) agree on a protocol for expressions of the FAR and certainty levels in their mutual communication.

A second application calls the verification application and the call includes an indicator on required level of certainty of $1/10000$. Since that level is estimated not to be fulfilled, a broken trust message is sent from the verification application to the second application. The broken trust message can also include the estimated FAR value.

The user provides verification data again, and this time, when the verification data is matched towards verification reference, the FAR is estimated to $1/100000$. Upon a new call from the second application, still with an indicator on required level of certainty of $1/10000$, a trust token is sent from the verification application to the second application since that level of certainty is estimated to be fulfilled. Here, the indicator can express the certainty level directly as for example $1/10000$, or the different levels can be encoded according to a certainty level scheme with two or more levels. Preferably, the levels are three or more. For example one level can represent certainty better than $1/1000000$, another level better than $1/10000$ and still another level represents certainty better than $1/100$. A default level can also be provided by the verification application in case the indicator is missing in a call, for example $1/10000$ for the three-level example above, and for example where the call is received from an application that do not have a multi-level calling mechanism or an assigned certainty level implemented. The levels can be encoded into the call in any appropriate way, and is preferably following a protocol assigned for the call. It is to be noted that the numbers given here are for easy understanding of the principles, and can vary depending on the implementations and the demands thereof.

Figure 6:
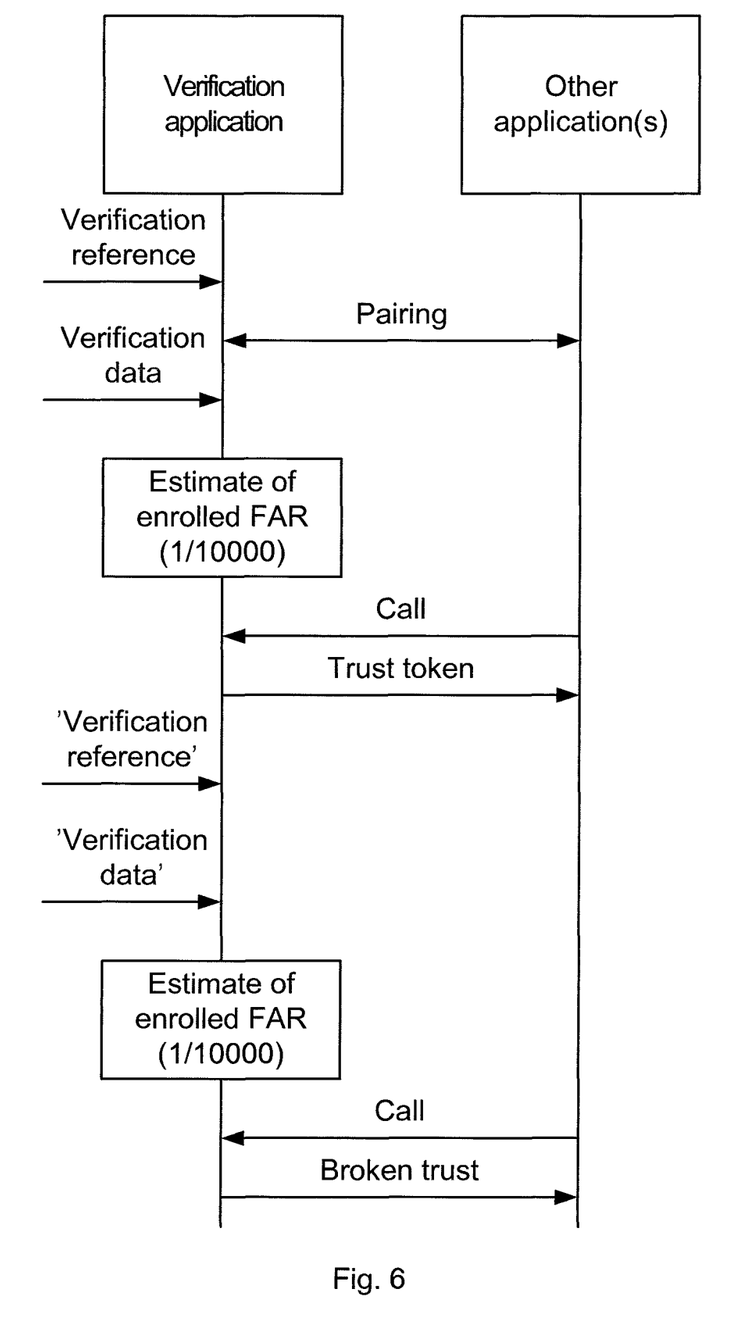
FIG. 6 is a signal scheme illustrating functions according to embodiments, in particular when verification references are added without proper trust.

FIG. 6 is a signal scheme illustrating functions according to embodiments, in particular when verification references are added without proper trust. Similar to what has been demonstrated above, verification reference is enrolled, the verification application and the other application are properly paired, and there is also a call from the other application, which may be with or without a required level of certainty, and which may be compared to an estimated FAR level, which is responded to with a trust token. Consider then that a new verification reference is enrolled, which may be from the authorised user or by someone else, and the corresponding verification data after that is input. The matcher may provide an estimate of FAR that is only $1/10000$, since the correspondence between the new verification reference and the input verification data is good. However, the verification application may still, upon a call from the other application, provide a message on broken trust since the verification reference does not belong to the data set which was present upon pairing of the verification application and the other application. This is to illustrate a possibility to a security setting where new verification references are not accepted, at least not without proper re-pairing or other security measures, for example as discussed above with reference to the pairing.

Figure 7:
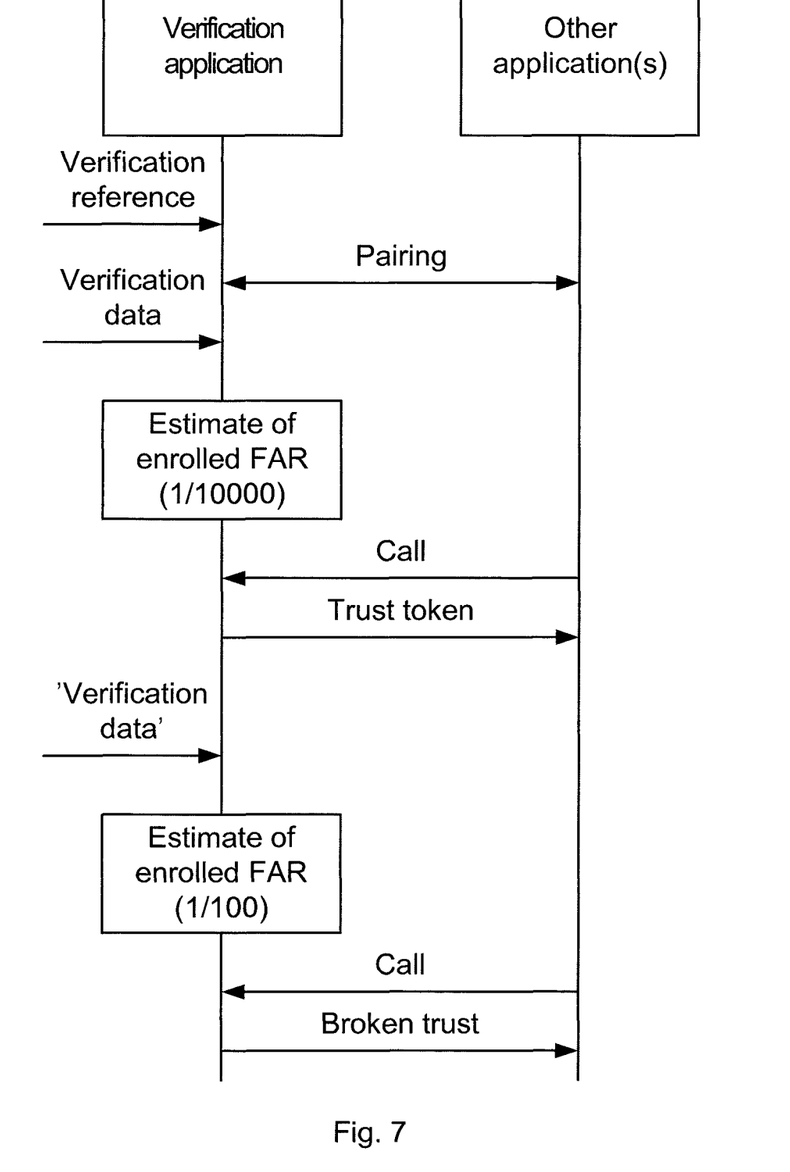
FIG. 7 is a signal scheme illustrating functions according to embodiments, in particular when certainty level has changed.

FIG. 7 is a signal scheme illustrating functions according to embodiments, in particular when certainty level has changed. Similar to what has been demonstrated above, verification reference is enrolled, the verification application and the other application are properly paired, and there is also a call from the other application, which may be with or without a required level of certainty, and which may be compared to an estimated FAR level, which is responded to with a trust token. Consider then that a new verification data is enrolled, which may be from the authorised user or by someone else. The estimated FAR level is only $1/100$ since correspondence between the verification reference and the input verification data is not that good, even if they are quite similar, or the used verification method is in itself rather weak, e.g. a short and low-complexity password. The verification application may then have a record on a previous required certainty level or on a FAR level being base for an earlier provided trust token, which significantly deviates from the level at hand. The verification application may then be arranged to provide a message on broken trust based on this large deviation. This is to illustrate a possibility to a security setting where large 10 deviations compared to historic values are not accepted, at least not without proper re-enrolment of verification data or other security measures.

Figure 8:
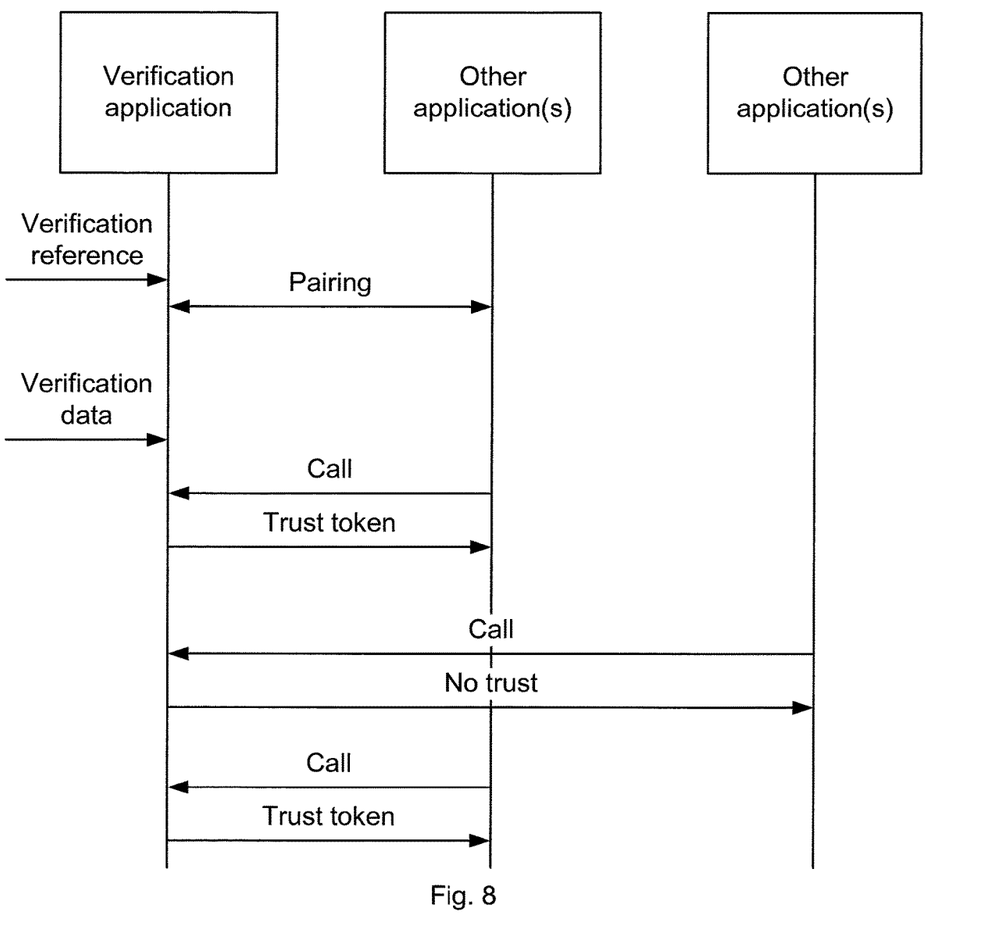
FIG. 8 is a signal scheme illustrating functions according to embodiments, in particular when properly paired and non-paired other applications operate with the verification application.

FIG. 8 is a signal scheme illustrating functions according to embodiments, in particular when properly paired and non-paired other applications operate with the verification application. Similar to what has been demonstrated above, verification reference is enrolled, the verification application and a first application are properly paired, and there is also a call from the first application, which may be with or without a required level of certainty, and which may be compared to an estimated FAR level, which is responded to with a trust token. Consider then a second application which calls the verification application which may be with or without a required level of certainty, and which may be compared to an estimated FAR level. However, the second application is not properly paired with the verification application. Thus, although the user is authenticated, which is further illustrated by the first application again calling the verification application and is responded by a trust token, the second application only gets a message indicating no trust. Preferably, no further information is provided to the second application, such as estimated FAR level or other possibly sensitive information. If the second application is properly arranged, it should be arranged for pairing, e.g. having proper certificates etc., which then can be arranged. If the second application is used for trying to unduly extract information from the verification application, this is prevented by only providing a no trust message.

Figure 9:
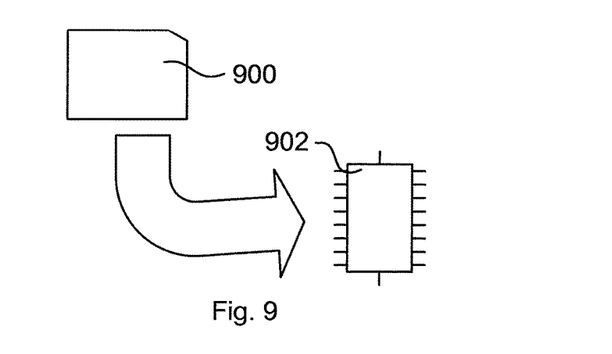
FIG. 9 schematically illustrates a computer-readable medium holding a computer program for implementing the verification application, and a processor arranged to run the verification application.

The methods according to the present invention are suitable for implementation with aid of processing means, such as computers and/or processors, especially for the case where the electronic device comprises the processor, as demonstrated above. As also discussed above, the applications are computer software implemented mechanisms that causes an electronic device with a processor to perform useful tasks beyond the running of the electronic device or processor itself, and thus also the verification application demonstrated in various embodiments above. Therefore, there is provided computer programs, comprising instructions arranged to cause the processing means, processor, or computer to perform the steps of any of the methods according to any of the embodiments described with reference to FIG. 3. The computer programs preferably comprises program code which can be stored on a computer readable medium 900, as illustrated in FIG. 9, which can be loaded and executed by a processing means, processor, or computer 902 to cause it to perform the methods, respectively, according to embodiments of the present invention, preferably as any of the embodiments described with reference to FIG. 9. The computer 902 and computer program product 900 can be arranged to execute the program code sequentially where actions of the any of the methods are performed stepwise. The processing means, processor, or computer 902 is preferably what normally is referred to as an embedded system. Thus, the depicted computer readable medium 900 and computer 902 in FIG. 9 should be construed to be for illustrative purposes only to provide understanding of the principle, and not to be construed as any direct illustration of the elements.

The invention has mainly been described above with reference to a few embodiments. However, as is readily appreciated by a person skilled in the art, other embodiments than the ones disclosed above are equally possible within the scope of the invention, as defined by the appended patent claims.

What is claimed is:

1. A verification software application on an electronic device arranged to interact with other software applications on the electronic device, the electronic device having a processor, a memory and an operating system controlling operation of the verification software application and the other software applications on the processor using arbitrary memory locations, where the other software applications are enabled to call the verification software application to securely determine authenticity of a user of the electronic device, wherein the verification software application is further arranged to receive verification data for secure determination of authenticity of the user, and provide, upon a call from any of the other software applications and a match between the verification data and a verification reference, a trust token to the calling software application, such that the trust token remains on the electronic device;

wherein the verification data comprises a biometric sample and the verification reference comprises a biometric reference;

wherein the verification software application is arranged to be paired with at least one of the other software applications by mutually exchanging at least one of an application signature, a cryptographic key or keys, a password, and a shared secret; and wherein the provision of the trust token is only performed when the verification software application and the one of the other software applications providing a call to the verification software application are properly paired.

2. The verification software application of claim 1, wherein parameters for generation of the trust token, upon installation of the verification software application on the electronic device, are set and the verification reference is enrolled.

3. The verification software application of claim 1, wherein the call from the one of the other software applications includes an indicator on a degree of required certainty in the match; and wherein the match between the verification data and the verification reference is considered present if an estimated false acceptance rate by a matching mechanism of the verification software application is less than the degree of required certainty in the match.

4. The verification software application of claim 3, wherein the trust token includes or is accompanied by an authenticity indicator; and wherein the authenticity indicator is based on the estimated false acceptance rate by the matching mechanism.

5. The verification software application of claim 1, further arranged to provide an indicator on broken or no trust if a degree of required certainty in the authentication for the match between the received verification data and the verification reference is reset to a lower certainty level than before the reset;

the calling software application is not properly paired with the verification software application; or a combination thereof.

6. The verification application of claim 1, wherein to receive verification data comprises to receive a biometric sample, the verification reference is a biometric reference and the match between the verification data and the verification reference is performed by a biometric matching mechanism of the verification software application; and wherein the biometric matching mechanism is arranged to match the biometric sample to the biometric reference.

7. A method of a verification software application on an electronic device arranged to interact with other software applications on the electronic device, the electronic device having a processor, a memory and an operating system controlling operation of the verification software application and the other software applications on the processor using arbitrary memory locations, the method comprising:

receiving a call, to the verification software application from one of the other software applications, to securely determine authenticity of a user of the electronic device;

receiving verification data;

authenticating the verification data by matching to a verification reference stored by the verification software application;

providing, upon a match between the verification data and the verification reference, a trust token to the calling software application, such that the trust token remains on the electronic device;

wherein the verification data comprises a biometric sample and the verification reference comprises a biometric reference;

pairing the verification software application with at least one of the other software applications by mutually exchanging at least one of an application signature, a cryptographic key, a password, and a shared secret; and wherein the providing of the trust token is only performed when the verification software application and the one of the other software applications providing a call to the verification software application are properly paired.

8. The method of claim 7, further comprising providing an indicator on broken or no trust if the degree of required certainty in the authentication for the match between the received verification data and the verification reference is reset to a lower certainty level than before the reset;

the calling software application is not properly paired with the verification software application; or a combination thereof.

9. The method of claim 7, further comprising, upon installation of the verification software application on the electronic device, setting parameters for generation of the trust token; and enrolling the verification reference.

10. The method of claim 7, wherein the call from the one of the other software applications includes an indicator on a degree of required certainty in the matching; and wherein the match between the verification data and the verification reference is considered present if an estimated false acceptance rate by the matching is less than the degree of required certainty.

11. The method of claim 10, wherein the trust token includes or is accompanied by an authenticity indicator;

wherein the authenticity indicator is based on the estimated false acceptance rate by the matching.

12. The method of claim 7, wherein the receiving of verification data comprises receiving a biometric sample, the verification reference is a biometric reference and the matching between the verification data and the verification reference is performed by biometric matching of the biometric sample to the biometric reference.

13. A computer program comprising computer executable instructions which when executed by a processor of an electronic device having the processor, a memory and an operating system controlling operation of software applications on the processor using arbitrary memory locations, wherein the computer executable instruction causes the processor to perform the method of claim 7.

14. An electronic device having a processor, a memory and an operating system, comprising a verification software application according to claim 1, at least one other software application enabled to call the verification software application to securely determine authenticity of a user of the electronic device, and a verification data input arranged to provide verification data to the verification software application, wherein the operating system is arranged to control operation of the verification software application and the other software applications on the processor using arbitrary memory locations.

15. The electronic device of claim 14, wherein the verification data input comprises a biometric reader arranged to provide biometric samples as verification data;

wherein to receive verification data comprises to receive a biometric sample, the verification reference is a biometric reference and the match between the verification data and the verification reference is performed by a biometric matching mechanism of the verification software application; and wherein the biometric matching mechanism is arranged to match the biometric sample to the biometric reference.

* * * * *